(12) United States Patent
Kuźniar (10) Patent No.: US 10,337,659 B2
(45) Date of Patent: Jul. 2, 2019

(54) DEVICE FOR CURING INNER LINING OF A PIPELINE

(71) Applicant: KANRES TECHNOLOGY, Bialobrzegi (PL)

(72) Inventor: Slawomir Kuźniar, Łańcut (PL)

(73) Assignee: BOLONIA Servicios E Ingenierus, S.L., Madrid (ES)

( * ) Notice: Subject to any disclaimer, the term of this patent is extended or adjusted under 35 U.S.C. 154(b) by 34 days.

(21) Appl. No.: 15/730,767

(22) Filed: Oct. 12, 2017

(65) Prior Publication Data
US 2018/0106413 A1   Apr. 19, 2018

(30) Foreign Application Priority Data

Oct. 18, 2016   (EP) ..................... 16002230

(51) Int. Cl.
| | |
|---|---|
| F16L 55/165 | (2006.01) |
| B29C 35/08 | (2006.01) |
| F16L 55/18 | (2006.01) |
| B29C 73/34 | (2006.01) |
| B29L 23/00 | (2006.01) |

(52) U.S. Cl.
CPC ...... *F16L 55/1653* (2013.01); *B29C 35/0805* (2013.01); *F16L 55/18* (2013.01); *B29C 73/34* (2013.01); *B29C 2035/0827* (2013.01); *B29L 2023/22* (2013.01)

(58) Field of Classification Search
CPC ...... F16L 55/1653; B29C 35/02; B29C 35/08; B29C 35/0805; B29C 35/0827; H01J 2237/3156
USPC .............. 250/492.1, 453.11, 454.11
See application file for complete search history.

(56) References Cited

U.S. PATENT DOCUMENTS

| | | | | |
|---|---|---|---|---|
| 2010/0051168 A1* | 3/2010 | Moeskjaer | ............ | F16L 55/165 156/64 |
| 2016/0131298 A1* | 5/2016 | Schleicher | .......... | F16L 55/1656 138/98 |
| 2017/0122481 A1* | 5/2017 | Czaplewski | .......... | F16L 55/164 |

* cited by examiner

*Primary Examiner* — Jason L McCormack
(74) *Attorney, Agent, or Firm* — Defillo & Associates; Evelyn A Defillo (57) ABSTRACT

The subject of the invention is a device for curing inner linings dragged into pipelines in the form of tubes impregnated with a UV resin. The device is equipped with a central segment of a rotating housing (1), having the form of a monolithic solid with cross-section of the shape similar to a square with two opposite sides (2 and 3) being rounded and provided with radiators (21) on their outer arched surfaces, while LEDs (17) are installed on the two other flat faces (14) of the solids; moreover, the rotating housing (1) is coupled, via a gear transmission (40), with an electric motor (39) setting said housing in rotational motion, whereas the housing has also an coaxial straight-through assembly hole (4) for electric connectors. Outer wall of said assembly hole is elongated and has side two-step annular offsets (5 and 6) and (7 and 8), with ball bearings (9) mounted on annular offsets (5 and 7) of the rotating housing (1), whereas a front annular stabilising lid (10) and a rear annular stabilising lid (10') are mounted on the front annular offset (6) and on the rear annular offset (8) of the housing. Upper inner ends of said stabilising rings are provided with annular recesses (11) in which a sleeve-shaped shield (13) made of quarts glass is permanently mounted to protect tightly both LEDs (17) and the two radiators (21) of the rotating housing (1).

7 Claims, 5 Drawing Sheets

Detail "S"

DEVICE FOR CURING INNER LINING OF A PIPELINE

FIELD OF THE INVENTION

The subject of the invention is a device for curing inner linings in pipelines introduced into them in the form of lining tubes impregnated with a resin.

BACKGROUND OF THE INVENTION

Worn-out and leaking pipelines, including sanitary sewerage systems, deteriorated usually because of insufficient maintenance, are subject to renovation by means of lining tubes impregnated with resins, dragged into the pipeline and bonding them with inner surface of the pipeline in order to eliminate leakage and soaking of carried liquids through the pipeline walls showing destructive impact on natural environment.

From patent description WO2004/104469 known is the method of renovation of pipelines consisting in dragging tubular linings made of thermosetting resins into the pipelines and curing them thermally with the use of hot water or hot steam.

Further, patent description WO93/15131 reveals a pipeline renovation method in which ultrasonic radiation is used to cure resin lining. To this end, a movable device is used equipped with ultrasonic transducers, introduced into and translated along the pipeline as well as the catalytic component of the resin contained in micro-capsules which are torn apart by energy of the ultrasonic field. The resin tube constituting a lining is placed in a pipeline and then cured by means of ultrasonic energy in order to release the curing catalyst.

A newer method of curing tubular resin lining on inner surface of pipeline consists in irradiation the lining with UV radiation and using for this purpose an electron vacuum tube, by introducing a source of such radiation into the pipeline to cure the resin lining by means of a device emitting said ultraviolet radiation.

However, it turned out that despite a number of good points characterising this method of curing resin pipeline linings, including minimisation of energy consumption compared with conventional method of curing resin linings by means of hot water of steam, the device has a serious flaw consisting in that UV radiation emitted from the device is very harmful to health and threatens lives of workers operating the devices.

Further, description of European No. EP 2129956 B1 reveals two design versions of the device for curing pipeline inner linings based on the use of light emitting diodes (LEDs) which, contrary to UV-radiation emitting devices based on application of vacuum tubes, are characterised with high stability, generally constant efficiency of energy or power emission level throughout the LED service life, whereas to increase effectiveness of these devices, they are equipped with an integrated fluid-based cooling systems. The device according to the first version of embodiment of this invention has a central eight-section (octahedral) segment of the device's housing provided on both ends with annular spacers, attached by means of fasteners, whereas the spacers with outer diameter adjusted to the inner diameter of pipeline lining have flange-shaped protrusions offsetted outside with holes for said fasteners, and within the vicinity of at least one of the spacers mounted is a fan forcing the flow of compressed air via inner axial hole in said segment of the device's housing. The fan cools also the LED contributing to dissipation of heat onto inner finned radiators situated opposite the LEDs. Further, the rear sleeve-shaped spacer situated on the fan's side is equipped with a Cardan joint allowing to couple the above-described single devices with a second analogous device. Moreover, each of the eight sections of the housing segment is equipped with a printed circuit board PCB with twelve diodes mounted on it, so that the housing segment has a total of 96 diodes, of which 95 are light emitting diodes (LEDs) and the one is a temperature or infrared detecting diode used to monitor temperature of inner surface of the cured pipeline lining, and further, PCB holds a temperature sensor to prevent increase of LED temperature above an admissible maximum level, said sensor being connected in series with light emitting diodes and used to de-energise the them in cases of detecting temperature values exceeding those pre-assumed to be the maximum admissible ones. Further, front portion of each profiled section of the device's housing segment has a cavity in which a transparent shield is placed to provide mechanical protection for LEDs placed under the cover, whereas opposite this protective shield, the above-mentioned printed circuit board PCB is placed with its front face oriented opposite the LEDs, coupled by means of the thermal conductivity with finned metallic element (radiator) radiating the heat out and channeling the heat generated by the light emitting inside the housing segment provided with a straight-through duct in which compressed air is supplied under pressure through said housing segment to cool the finned metallic elements and thus cooling LEDs emitting electromagnetic radiation. Each of the eight profiled sections of the device's housing segment is positioned in a way allowing to connect it to the neighbouring analogous profiled housing section and thus obtain the octahedral segment of the housing, whereas side surfaces of each section, which are to be connected to side surfaces of neighbouring sections of the housing, are provided with semicircular hollows, allowing to interconnect the eight profiled sections of the housing with each other by means of straight-through pins inserted in them.

In another version of embodiment of the device according to the invention, the device comprises has two housing segment, both having the shape of a circular cylinder, assembled out of six arched sections of each segments of the housing, and each of the sections is equipped with twelve LEDs and six front elements with the profile of a ring segment, connected with each other by means of spacers and securing pins so that the two segments housing members connected with each other have a total of twelve sections containing a total one hundred and forty four LEDs.

SUMMARY OF THE INVENTION

The objective of the present invention is to provide a simple and compact design of a device for curing inner pipeline linings impregnated with UV-cured resins, without forced compressed air circulation with the use of a fan to cool LEDs, supplying at the same time several times more electromagnetic energy radiation onto surface of the cured lining and thus allowing to cure resin lining to larger depth compared to devices of that type known in the prior art. On the other hand, the technical problem that needed to be solved consisted in developing a design of a device, construction of which would allow to concentrate the whole power of LEDs on a circular sector and increase efficiency of cooling the diodes in the course of generating electromagnetic emission, allowing to achieve objectives according to the invention.

The device for curing inner lining of a pipeline according to the invention is characterised in that it is equipped with a central segment of the rotating housing having the form of a monolithic solid with cross-section having the shape similar to a square with two opposite sides being rounded, which on their outer arched surfaces are provided with radiators, while the two other flat surfaces carry light emitting diodes LEDs, and further the rotating housing is coupled, by means of a gear transmission, with electric motor setting the housing in rotational motion, whereas the housing has also an axial straight-through assembly hole, outer wall of which, on both faces of the solid, is elongated and has side two-step annular offsets. Ball bearings are mounted on the two opposite outermost offsets of the rotating housing, whereas a front annular stabilising lid and a rear stabilising lid are mounted on the front annular offset and on the rear annular offset of said rotating housing. Upper inner ends of said stabilising lids are provided with annular recesses for mounting a sleeve-shaped shield, made of quarts glass, protecting tightly both LEDs and the two radiators of the rotating housing. Further, the front face of the stabilising lid is joined with a sleeve-shaped body, inside which a monitoring camera is located, front face of said camera equipped with glass plate being located in an axial hole of the annular lid, equipped with LEDs and coupled detachably with the front face of the body, whereas the lid is provided with straight-through holes to discharge the air cooling the radiators and profiled straight-through holes situated opposite the diodes. Moreover, the face of the rear annular stabilising lid is coupled detachably with a sleeve cover, whereas a sleeve-shaped stuffing box with an axial hole for the hose supplying cooling compressed air is screwed into axial hole of said sleeve cover. The hose carries also in its interior an electric conductor for supplying electric power, via the two stabilising lids, to both LEDs and the electric motor, whereas said motor is mounted in a seat of the cover and coupled with the rotating housing by means of a gear transmission.

It is favourable when a hub of the axial driving rotor is coupled detachably with the rear face of the rotating housing of the device and equipped with blades distributed evenly along its perimeter, said rotor being driven by means of compressed air supplied through hose fixed in axial hole of the sleeve-shaped stuffing box.

It is also favourable when the central segment of the device constitutes a rotating housing in the shape of a cylinder with two flat faces situated opposite each other, with plastic plates carrying LEDs fixed to said faces, connected further with rotary electric connectors mounted in an axial assembly hole of the housing, whereas both rounded surfaces of the housing are provided with outer fans, whereas outer diameter "D" of radiators of the housing is larger than the diameters of adjacent face surfaces of both annular lids and other components of the device coupled with said annular lids.

It is further favourable when the central segment of the device constitutes a cylindrical rotating housing which has three arms of the same length fixed permanently to external surface of said housing and distributed evenly along its perimeter, at half length of the generatrix of the cylindrical side surface of the housing, and identical segments, which have the shape of cuboidal solids provided with radiators on their lower and side faces, are fixed to said arms, while upper outer faces of the segments are equipped with plastic plates with LEDs installed in them.

Besides, in all variants of the device, two vehicle assemblies are detachably coupled to outer surfaces of the sleeve-shaped body, the sleeve cover, and the front annular lid, whereas each vehicle assembly comprises three arms with identical lengths distributed evenly along perimeters of components to which they are attached, and outer ends of the arms are equipped with two revolving wheels each.

The use of a rotating housing in the form of a solid with cross-section having the shape similar to a square two opposite sides of which are rounded in such a way, that they are situated on a common circle, and their walls are provided with radiators, while LEDs are installed on the remaining flat faces, and setting the housing in rotational motion by means of an electric motor or an axial driving rotor, allowed to focus all power of electromagnetic radiation only on the segment of cured pipeline lining and us the radiation emitted by the diodes to irradiate the whole surface of pipeline lining surrounding the rotating housing, contrary to the technical solutions used in design of such devices known in the prior art. Moreover, unlike in other devices used in the prior art where diodes were evenly distributed on the whole inner surface of their housings, diodes are distributed only on two surfaces of the rotating housing according to the invention and in case of the same power of LEDs installed in the surfaces, the device according to the invention supplies several times more energy of electromagnetic radiation onto a defined surface of the pipeline as a result of which the electromagnetic waves penetrate deeper the resin deposited on inner surface of the pipeline. The effect allows to use the device for curing inner linings of pipelines according to the present invention to cure linings of pipelines with larger diameters or to cure UV-cured resins to significantly larger depths compared to devices known and used for this purpose in the prior art.

DETAILED DESCRIPTION OF THE INVENTION

Figure 1:
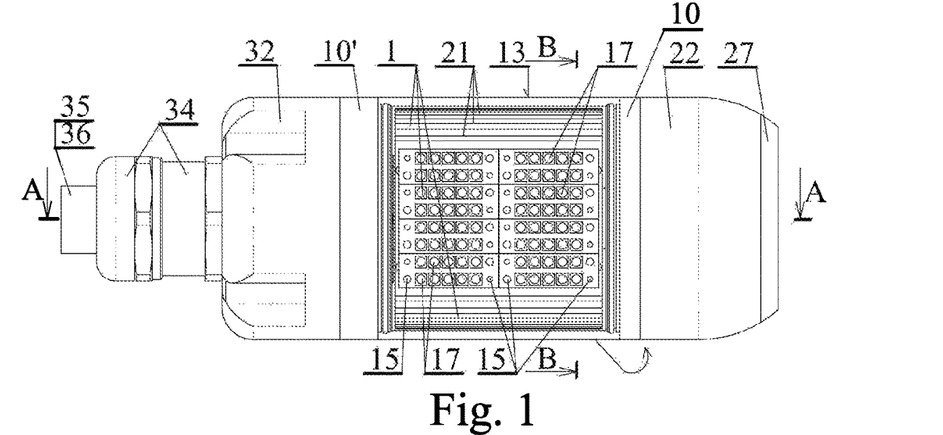
FIG. 1 shows a front view of the first embodiment of the device for curing inner pipeline lining equipped with electric motor which drives the device's rotating housing by means of a gear transmission.
Figure 2:
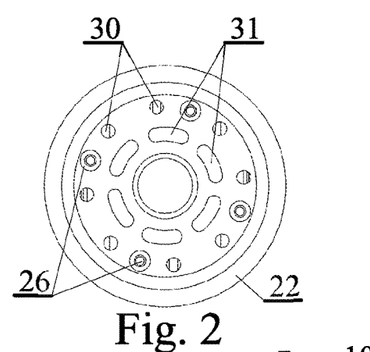
FIG. 2 shows a side view of the device of FIG. 1.
Figure 3:
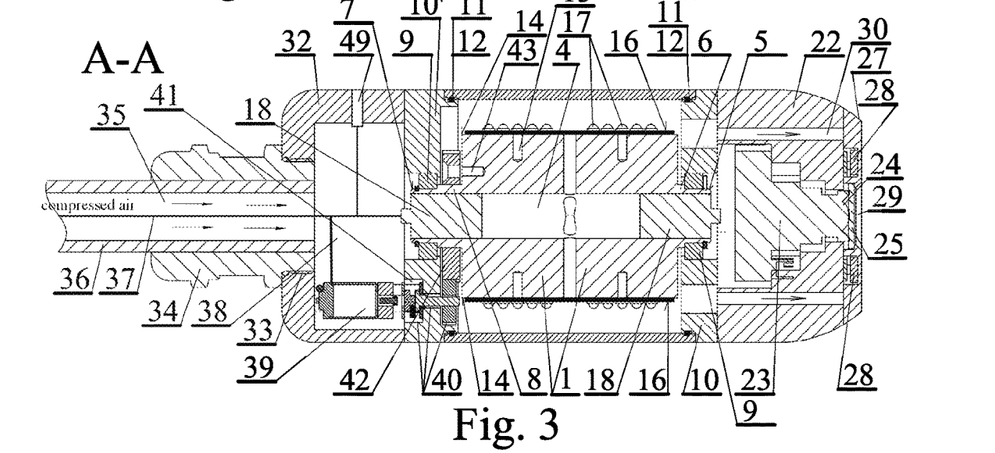
FIG. 3 shows a cross section view along line A-A of FIG. 1.
Figure 4:
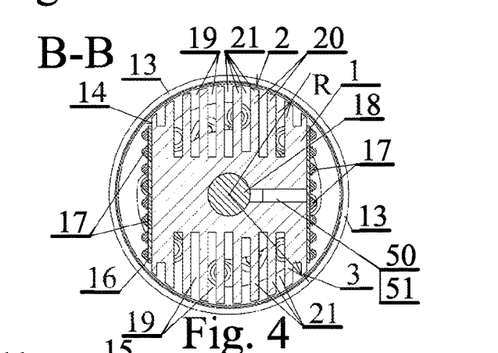
FIG. 4 shows a cross section view along line B-B of FIG. 1.
Figure 5:
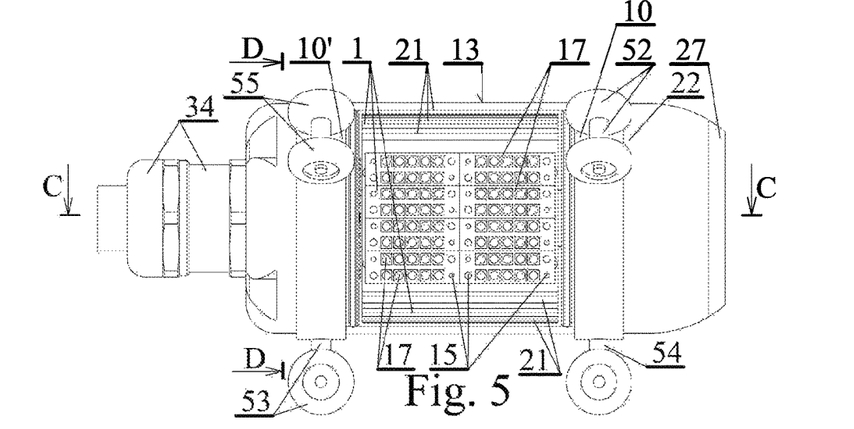
FIG. 5 shows a front view of the second embodiment of the device of the present invention including a driving rotor.
Figure 6:
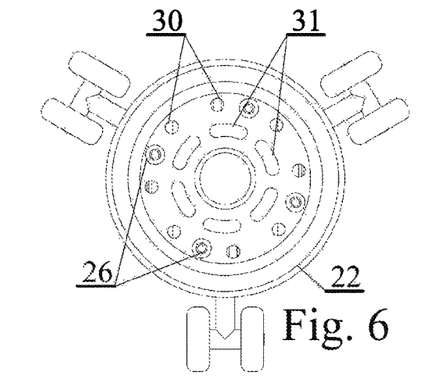
FIG. 6 shows a side view of the device of FIG. 5.
Figure 7:
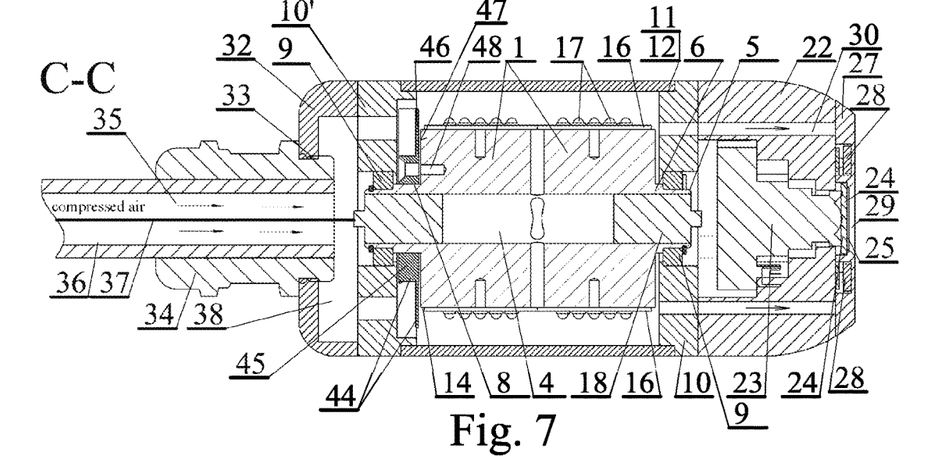
FIG. 7 shows a cross section view along line C-C of FIG. 5.
Figure 8:
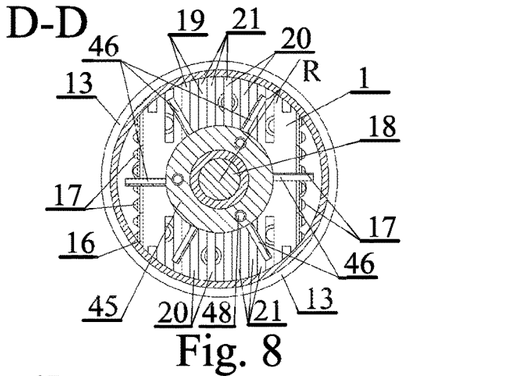
FIG. 8 shows a cross section view along line D-D of FIG. 5.
Figures 9, 10, 11:
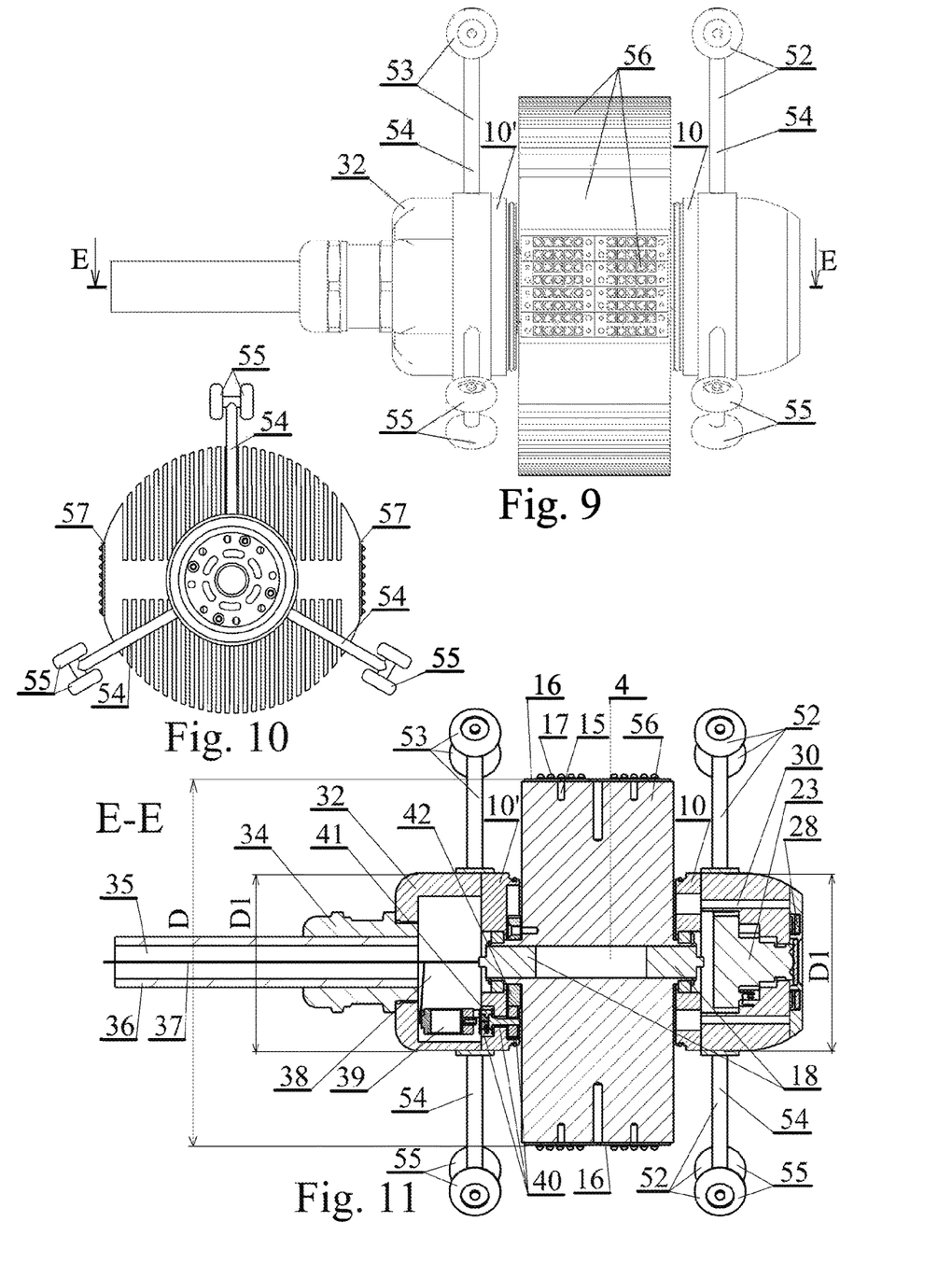
FIG. 9 shows front view of a third embodiment of the device for curing pipeline inner resin lining, equipped with an electric motor which drives also the device's rotating housing by means of a gear transmission, where the radiator portion of the housing has diameter about two times larger than diameters of the adjacent lids, the sleeve cover, and the camera body, in the front view.
FIG. 10 shows a side view of the device of FIG. 9.
FIG. 11 shows a cross sectional view of the device of FIG. 9 along line E-E.
Figures 12, 13, 15:
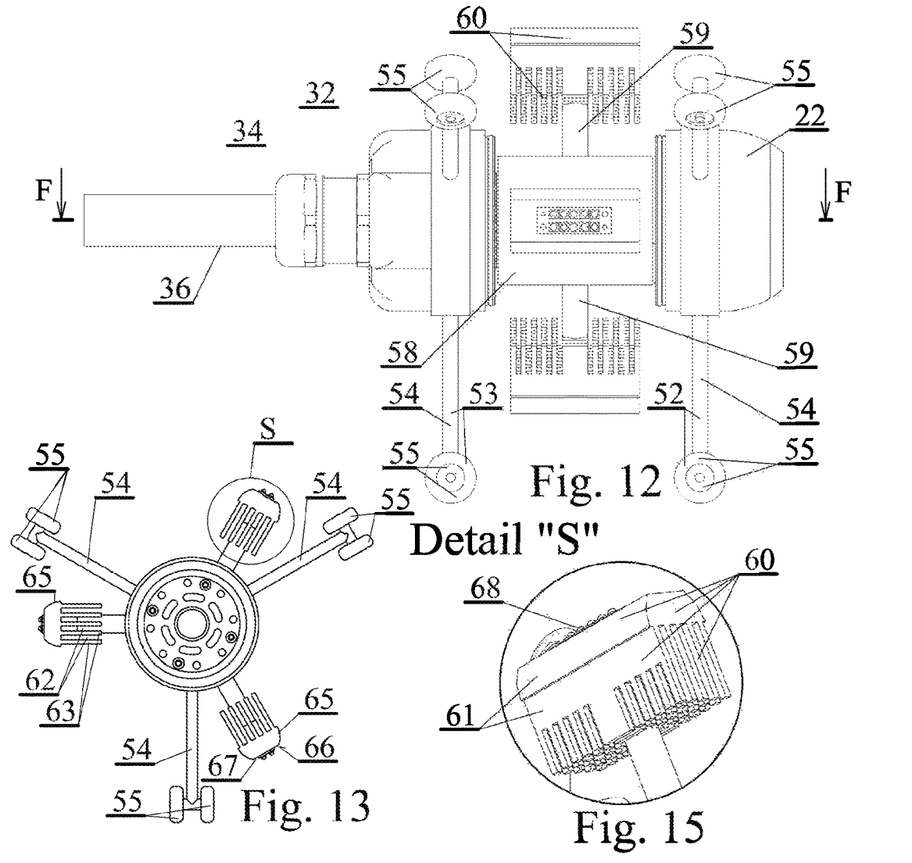
FIG. 12 shows a front view of the fourth embodiment of the device for curing pipeline inner resin lining also equipped with electric motor driving, via a transmission gear, the rotating housing of the device provided with three arms distributed evenly on its perimeter with identical segments fixed to ends of the arms and equipped with radiators mounted on ends and above them, plates carrying LEDs.
FIG. 13 shows a side view of the device of FIG. 12.
FIG. 15 shows an enlarged detail "S" of a segment of the rotating housing of the device in a perspective view.
Figure 14:
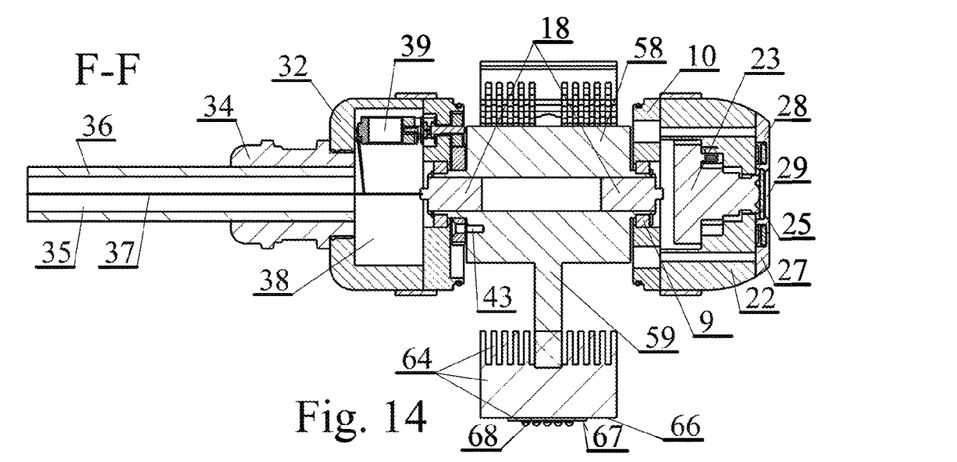
FIG. 14 shows the device after removing vehicle assemblies in axial section along line F-F.
Figure 16:
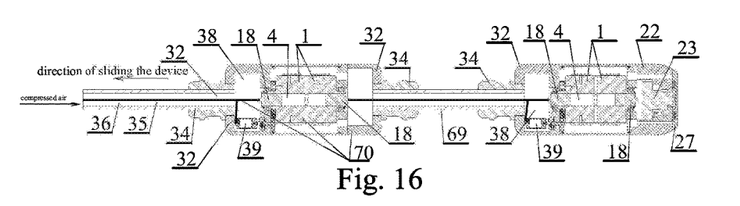
FIG. 16 shows a cross sectional view of an example system composed of two devices coupled with each other and with vehicle assemblies removed prepared for introducing into a cured resin lining of a pipeline.

The subject of the invention has been shown in four examples of its embodiments on drawings of which FIG. 1 shows the first variant of embodiment of the device for curing inner pipeline lining, equipped with electric motor which drives the device's rotating housing by means of a gear transmission, in the front view; FIG. 2—the same device in the side view; FIG. 3—the same device in axial section along line A-A; FIG. 4—the same device in cross-section along line B-B; FIG. 5—the second variant of embodiment of the same device but equipped with driving rotor, in the front view; FIG. 6—the same device; FIG. 7—the same device in axial section along line C-C of FIG. 7; FIG. 8—the same device in cross-section along line D-D after removing vehicle assemblies; FIG. 9—the third variant of embodiment of the device for curing pipeline inner resin lining, equipped with an electric motor which drives also the device's rotating housing by means of a gear transmission, where the radiator portion of the housing has diameter about two times larger than diameters of the adjacent lids, the sleeve cover, and the camera body, in the front view; FIG. 10—the same device in the side view; FIG. 11—the same device in axial section along line E-E; FIG. 12—the fourth variant of embodiment of the device for curing pipeline inner resin lining also equipped with electric motor driving, via a transmission gear, the rotating housing of the device provided with three arms distributed evenly on its perimeter with identical segments fixed to ends of the arms and equipped with radiators mounted on ends and above them, plates carrying LEDs, in the front view; FIG. 13—the same device in the front view; FIG. 14—the same device after removing vehicle assemblies in axial section along line F-F; FIG. 15—enlarged detail "S" of a segment of the rotating housing of the device in a perspective view; FIG. 16—an example system composed of two devices coupled with each other and with vehicle assemblies removed prepared for introducing into a cured resin lining of a pipeline, in axial section; and FIG. 17—an example system comprising three devices coupled with each other prepared for introducing into a cured resin lining of a pipeline, in axial section.

The device for curing pipeline inner linings impregnated with UV-cured resin according to the first variant of its embodiment shown in FIGS. 1-4 has a central segment of the rotating housing 1 in the form of a monolithic solid with cross-section having the shape similar to a square two sides of which, 2 and 3, are rounded and have the same radius "R", having an axial straight-through assembly hole 4 outer wall of which, on both faces of the solid, has side two-step annular offsets, 5 and 6, and 7 and 8. Ball bearings 9 are mounted on annular offsets 5 and 7, whereas two annular lids, a front lid 10 and a rear lid 10', are mounted on the front annular offset 6 and on the rear annular offset 8. Said annular lids stabilise position of the rotating housing 1, and their upper inner ends are provided with annular recesses 11 to mount a packing 12 and a sleeve-shaped shield 13 made of quartz glass, whereas outer surface of the shield is flush with outer surfaces of annular lids 10 and 10'. Further, plastic plates 16 are fixed to both flat surfaces 14 of the rotating housing 1 by means of screws 15, said plates arranged in four rows, four plates in each row, with light emitting diodes (LEDs) 17 installed in said plates, ten LEDs on each plate. The LEDs are supplied by means of electric conductors connected to a rotary electric connector 18 fixed on both ends of axial hole 4 of the rotating housing 1, whereas both surfaces of the rounded sides 2 and 3 of the housing are provided with longitudinally situated and parallel slit grooves 19 which, together with protrusions 20 provided between them constitute two radiators 21, which in turn, together with sets of LEDs 17 situated between are surrounded with a permanent sleeve-shaped glass shield 13. Moreover, the front face of the stabilising lid 10 holds a sleeve-shaped body 22, with a monitoring camera 23 with similar profile is mounted on inner profiled surface of the body, and the face 24 of the central portion of the camera protrudes outside the outer face of its body 22, equipped with a glass plate 25, whereas screws 26 join the face of said body to an annular front lid 27 equipped with LEDs 28 used to illuminate the camera 23, said lid having an axial hole 29 in which the front face of the camera is mounted together with its glass plate 25; further, the lid is provided with eight circular holes 30 playing the role of outlets for air cooling LEDs 13 and lower, with six bean-shaped holes 31 for LEDs 28. Camera 23 allows to determine position of the device in pipeline on current basis and asses the condition of internal thermosetting resin lining of the pipeline before and after activation of electromagnetic radiation emitted by LEDs 17. On the other hand, face of the rear annular lid 10' is connected with sleeve cover 32 with axial hole in its bottom 33, into which a sleeve-shaped stuffing box 34 with an axial hole (duct) 35 is screwed for a hose 36 supplying compressed air. The hose is at the same time a guide for an electric conductor 37 supplying electric power, via stabilising lids 10 and 10', both to LEDs 17 and to the electric motor 39. Said motor, mounted in a seat 38 provided in said sleeve cover, sets the rotating housing 1 of the device in rotational motion, whereas said motor, via a gear transmission 40 mounted in a seat 41 of rear lid 10' and coupled with the motor, is coupled mechanically also with an annular element 42 mounted on an annular recess 8 of the rotating housing 1, said annular element constituting also an element of the transmission, fixed additionally by means of fastening bolts 43 to the front face of the housing, as a result of which, after connecting the motor to electric power grid, the rotating housing 1 is set in rotational motion together with LEDs 17 mounted on it.

The device for curing pipeline inner resin linings according to the second variant of its embodiment shown in FIGS. 5-8 has a structure similar to this described above in the first variant of its embodiment, and the structural difference between them consists only in that in the second variant of embodiment, instead of providing the drive for rotating housing 1 by means of electric motor 39 and gear transmission 40, the drive in the form of an axial driving rotor 44 was employed. For that reason, a hub 45 of the axial driving rotor 44 is mounted on the annular recess 8 of the rotating housing 1, whereas six blades 46 are distributed evenly on the hub 45 which is fastened to the front surface 47 of the housing by means of fastening bolts 48.

Both variants of the device are also equipped with a infrared radiation sensor 49 mounted in the sleeve cover 32, used to control temperature of the tubular lining, and a sensor 50 controlling temperature of LEDs 17 mounted in hole 51 of the rotating housing 1 under plate 16 holding the LEDs, both sensors used to control correct operation of the devices. Moreover, both variants of the device shown in FIGS. 1-4 on one hand and FIGS. 5-8 on the other, are equipped with two vehicle assemblies 52 and 53 each. Each assembly comprises three arms 54 with identical lengths, whereas arms 54 of the unit 52 are coupled detachably with the sleeve body 22, and arms 54 of the unit 53 are coupled to the rear annular lid 10' and to the sleeve cover 32. The arms 54 are distributed evenly (every 120°) along perimeters of the cylindrical components, and their outer ends equipped with two revolving wheels 55 each. The wheels are internally tangent to a circle with diameter equaling the inner diameter of the cured tubular resin lining.

The device for curing inner resin-based pipeline linings according to the third variant of its embodiment shown in FIGS. 9-11 has also a central segment of the rotating housing 56 but in the form of cylinder with diameter "D" and on its rounded outer surface provided with two identical flat truncations 57 situated opposite each other to which plastic plates 16 are attached by means of screws 15. The plates are arranged in two rows and have LEDs 17 installed on them and connected by means of electric conductors to a rotary electric connector 18 mounted on both ends of an axial hole 4 of the rotating housing 56, whereas both rounded surfaces 2 and 3 of the housing are provided with identical radiators 21. The following components are fixed to both profiled surfaces of the rotating housing 56 and to rotary electric connectors 18 mounted in an axial straight-through assembly hole 4, respectively: a front annular lid 10 and a rear annular lid 10', and further all other components making up the structure of the above-described device representing its first variant shown in FIGS. 1-4, whereas diameter "D" or radiators 21 of the rotating housing is about twice as large that diameters "D1" of both the lids 10 and 10' adjacent to faces of the housing and the remaining components fixed to said lids. Moreover, also this exemplary device is equipped with two vehicle assemblies 52 and 53 comprising three arms 54 with identical lengths, of which assembly 52 is fixed also to the sleeve body 22 of the monitoring camera 23, and the unit 53 to the rear annular lid 10' and sleeve cover 32 housing inside the electric motor 39, whereas arms 54 of both vehicle assemblies 52 and 53 are evenly (every 120°) distributed on their perimeters, and their outer ends are equipped with two revolving wheels 55 each. The wheels are internally tangent to a circle with diameter equalling the inner diameter of the cured tubular resin lining.

Further, the device for curing pipeline inner resin linings according to the fourth third variant of its embodiment shown in FIGS. 12-14 has also a central segment of cylindrical rotating housing 58 and, on its outer surface, at half of its length, three arms 59 of identical length distributed evenly (every 120°) along its perimeter and joined with it permanently. Analogous segments 60 are fixed to ends of said arms, said segments have the form of cuboidal solids 61 provided with a system of perpendicular grooves 62 creating thus a system of protrusions 63 on lower and side faces of the cuboidal faces, which together play the role of a radiator 64, whereas the solids have longer rounded edges 65 on their upper ends and plastic plates 67 with LEDs 68 mounted in them are attached to their upper flat surfaces 66. Also in this embodiment variant, the device is equipped with two vehicle assemblies 52 and 53 comprising three arms 54 with identical lengths, of which the vehicle assembly 52 is fixed also to the sleeve-shaped body 22 of the monitoring camera 23, and the vehicle assembly 53 to the rear annular lid 10' and sleeve cover 32 holding electric motor 39 inside, whereas arms 54 of both vehicle assemblies 52 and 53 are equally distributed (every 120°) on their perimeters, and their outer ends are equipped with two revolving wheels 55 each. The wheels are internally tangent to a circle with diameter equalling the inner diameter of the cured tubular resin lining.

The device according to the invention, constructed e.g. as per the first variant of its embodiment shown in FIGS. 1-4, is placed, depending on actual needs, as a single device inside the front end of tubular lining containing UV-cured resin and drawn earlier into the repaired pipeline, and next, compressed air is supplied to the interior of the lining and to the devices via its sleeve-shaped stuffing box 34; further electric motor 39 is started setting thus the rotating housing 1 of the device together with LEDs 17 into rotational motion; and the whole device moves along the pipeline towards its rear end from which compressed air is supplied. As a result of pressure exerted by compressed air, the tubular lining soaked resin is pressed against inner surface of the pipeline and operation of electromagnetic radiation generated with a defined wavelength range by rotating LEDs 17 results in the desired curing of the pipeline lining along the whole of its length.

Figure 17:
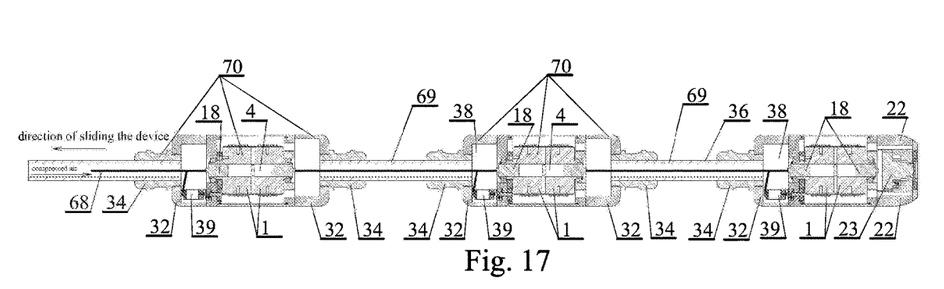
FIG. 17 shows a cross sectional view of an example system comprising three devices coupled with each other prepared for introducing into a cured resin lining of a pipeline, in axial section.

Having in mind improvement of efficiency of the process and quality of the cured lining, two or three devices of that type can be connected in series with each other by means of tubular elements 69, as can be seen in FIGS. 16 and 17, and introduced to tubular resin-based lining placed earlier in the pipeline. However, in this case only the last device will be complete and equipped with camera 23, as can be seen in FIGS. 1-4. This complete device is placed in the front portion of pipeline and in the other device or devices 70, whereas instead of the assembly comprising the sleeve-shaped body 22 joined with front annular lid 10, covered with front lid 27, the LEDs 28, and the camera 23 installed between them, the same device is used, in which the above-mentioned components 22, 23, 27, and 28, which were fixed to the front annular lid 10, are replaced with identical sleeve cover 32 and a stuffing box 34, both of them attached also to the rear annular lid 10'.

LEGEND

1—rotating housing
2—rotating housing, rounded side
3—rotating housing, rounded side
4—rotating housing, axial circular hole
5—annular recess
6—annular recess
7—annular recess
8—annular recess
9—ball bearings
10—front annular lid
10'—rear annular lid
11—annular lids, annular recesses
12—sleeve-shaped shield, packing
13—sleeve-shaped shield, glass
14—housing, two flat faces
15—screws fastening LED plates
16—LED plates
17—LEDs 18—electric connector
19—slit grooves in rounded housing faces
20—protrusions between slit grooves
21—radiators
22—camera, sleeve-shaped body
23—camera
24—camera, front face
25—camera, front face, glass plate
26—screws fixing lid /front camera body
27—front lid
28—LEDs, camera lighting
29—camera lid, axial hole
30—front lid face, circular holes
31—camera lid face, bean-shaped holes
32—sleeve cover
33—sleeve cover, bottom
34—sleeve-shaped stuffing box
35—axial hole/duct
36—compressed air supplying hose
37—electric conductor
38—sleeve cover, seat
39—electric motor
40—gear transmission
41—rear lid, seat
42—annular element
43—bolts
44—axial driving rotor
45—driving rotor hub
46—driving rotor blades
47—front surface, rotating housing
48—fastening bolts
49—IR sensor
50—LEDs temperature sensor
51—hole for temperature sensor
52—vehicle assembly
53—vehicle assembly
54—vehicle assemblies, arms
55—vehicle assemblies, arms, revolving wheels
56—cylindrical rotating housing of the device
57—cylindrical rotating housing, flat truncations
58—cylindrical housing
59—housing arms
60—housing arm segments
61—cuboidal solids
62—segments, grooves
63—segments, protrusions
64—segments, radiators
65—segments, rounded corners
66—segments, flat surfaces
67—LEDs, plastic plates
68—LEDs
69—tubular elements connecting devices
70—devices without cameras

The invention claimed is:

1. A device for curing pipeline inner linings based on a UV-cured resin compound comprising:
a central polyhedral segment having a rotating housing with light emitting diodes (LEDs) (17) generating an electromagnetic radiation with wavelengths in the range 200-500 nm to cause curing of said resin compound, said LEDs (17) shielded by a transparent plastic element,
annular spacers are fixed to faces of the rotating housing;
wherein the rotating housing (1) is a monolithic solid with cross-section having a shape of a square with two rounded opposite sides having radiators (21) to remove heat from the light emitting diodes (17);
wherein the LEDs (17) are installed on two flat surfaces (14) on the rotating housing (1), the two flat surfaces (14) are coupled via a gear transmission (40) to an electric motor (39) to rotate the rotating housing,
wherein the rotating housing has an axial straight-through hole (4) to provide compressed air to cool the light emitting diodes (17), the axial straight-through hole (4) having a first end with a rear two-steps annular offset (5) and a front two-steps annular offset (6) and a second end with a front two-steps annular offset (7) and a rear two-steps annular offset (8),
wherein the rear two-steps annular offset (5) of the first end and the front two-steps annular offset (7) of the second end of the rotating housing (1) are used to mount ball bearings (9),
wherein the front two-steps annular offset (6) of the first end and the rear two-steps annular offset (8) of the second end of the rotating housing are used to mount a front annular stabilizing lid (10) and a rear annular stabilizing lid (10'), with upper inner ends of both lids being provided with annular recesses (11) in which a shield (13) made of quartz glass is permanently mounted to protect tightly both the LEDs (17) and the radiators (21) of the rotating housing (1).

2. The device according to claim 1, wherein a body (22) is fixed to a front face of the stabilizing lid (10), the body (22) having a monitoring camera (23), wherein a front face of the camera includes a glass plate (25), the front face of the camera is placed in an axial hole (29) of an annular lid (27), the annular lid (27) including LEDs (28) and is detachably coupled with the front face of said body, while said annular lid is provided with straight-through holes (30) to discharge the compressed air introduced by the radiators (21) and profiled straight-through holes (31) situated opposite said LEDs.

3. The device according to claim 1, wherein a front face of the rear annular stabilizing lid (10') is coupled detachably with a cover (32), said cover being provided with axial hole (33) into which a stuffing box (34) is screwed with axial hole (35) for a hose (36) that supplies the compressed air to the radiators for cooling, and carrying also in its interior an electric conductor (37) supplying, via the stabilizing lids (10 and 10'), electric power to the LEDs (17) and to the electric motor (39) mounted in a seat (38) of the sleeve cover (32), said electric motor being coupled with the rotating housing (1) by the gear transmission (40).

4. The device according to claim 1, wherein a rear face of the rotating housing (1) is detachably connected to a hub (45) of an axial driving rotor (44), wherein said hub includes blades (46) evenly distributed on its perimeter, and said rotor is driven by the compressed air supplied by a hose (36) mounted in the axial hole (35) of the stuffing box (34).

5. The device according to claim 1, wherein plastic plates (16) are detachably fixed to the two flat surfaces (14) and the LEDs (17) are installed on said plastic plates and are connected with rotary electric connectors (18) mounted in the axial straight-through hole (4) of the rotating housing, wherein the radiators (21) have an outer diameter "D" larger than a diameter of the annular lids (10 and 10') adhering to faces of the housing and diameters of other components of the device fixed to said lids.

6. The device according to claim 1, wherein the rotating housing includes an outer surface having three arms (59) with identical lengths, the three arms (59) are distributed evenly along a perimeter of the rotating housing and are permanently fixed to said rotating housing at half of its length, wherein identical segments (60) are mounted at ends of the three arms, said identical segments include cuboidal solids (61) provided with radiators (64) on a lower and a side faces, wherein upper outer surfaces (66) of said cuboidal solids are equipped with plastic plates (67) with LEDs (68) installed on them.

7. The device according to claim 2, wherein vehicle assemblies (52 and 53) are detachably fixed to outer surface of the body (22), a sleeve cover (32), and the front annular stabilizing lid (10'), wherein each one of said vehicle assemblies comprises three arms (54) having identical lengths and distributed evenly along perimeters of components to which they are fixed, and outer ends of said arms are equipped with two revolving wheels (55) each.

* * * * *

UNITED STATES PATENT AND TRADEMARK OFFICE
CERTIFICATE OF CORRECTION

PATENT NO. : 10,337,659 B2  
APPLICATION NO. : 15/730767  
DATED : July 2, 2019  
INVENTOR(S) : Slawomir Kuzniar Page 1 of 1

It is certified that error appears in the above-identified patent and that said Letters Patent is hereby corrected as shown below:

On the Title Page

(72) Assignee should read: BOLONIA Servicios E Ingenieros, S.L., Madrid (ES)

Signed and Sealed this  
Twenty-fifth Day of February, 2020

Andrei Iancu  
*Director of the United States Patent and Trademark Office*